United States Patent
Zeh et al.

(10) Patent No.: US 12,512,966 B2
(45) Date of Patent: *Dec. 30, 2025

(54) TRANSPORT LAYER AUTHENTICITY AND SECURITY FOR AUTOMOTIVE COMMUNICATION

(71) Applicant: Infineon Technologies AG, Neubiberg (DE)

(72) Inventors: Alexander Zeh, Munich (DE); Vivin Richards Allimuthu Elavarasu, Munich (DE); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 698 days.

This patent is subject to a terminal disclaimer.

(21) Appl. No.: 17/633,388

(22) PCT Filed: Jul. 28, 2020

(86) PCT No.: PCT/EP2020/000136
§ 371 (c)(1),
(2) Date: Feb. 7, 2022

(87) PCT Pub. No.: WO2021/028066
PCT Pub. Date: Feb. 18, 2021

(65) Prior Publication Data
US 2022/0294607 A1   Sep. 15, 2022

(30) Foreign Application Priority Data
Aug. 9, 2019 (DE) .......................... 102019005608.6

(51) Int. Cl.
*H04L 9/08* (2006.01)
*H04L 12/40* (2006.01)

(52) U.S. Cl.
CPC .......... *H04L 9/0819* (2013.01); *H04L 9/0861* (2013.01); *H04L 12/40* (2013.01);
(Continued)

(58) Field of Classification Search
CPC ..... H04L 9/0819; H04L 9/0861; H04L 12/40; H04L 2012/40215; H04L 2012/40273;
(Continued)

(56) References Cited

U.S. PATENT DOCUMENTS 8,607,051 B2    12/2013  Narayanan et al.
9,935,774 B2 *   4/2018  Sharma ................ H04L 9/3242
(Continued)

FOREIGN PATENT DOCUMENTS

CN    106899404 A    6/2017
DE    102011089214 A1    6/2013
(Continued)

OTHER PUBLICATIONS

"OSI-Modell." Wikipedia. May 2, 2020. URL: https://de.wikipedia.org/w/index.php?title=OSI-Modell&oldid=190650220.
(Continued)

*Primary Examiner* — Bryan F Wright
(74) *Attorney, Agent, or Firm* — Harrity & Harrity, LLP

(57) ABSTRACT

A sender configured to participate in an in-vehicle network is configured to receive a request for transmitting a payload and generate, in response, a first header in a transport layer and/or a network layer. The sender is further configured to access a key of k bytes length and to generate an authentication tag using the key and at least the first header as additional authentication data. The authentication tag serves to indicate an authenticity of a first frame on the transport and/or network layer as an original frame sent from the sender to a receiver. The sender is configured to generate the first frame comprising the first header, a transport layer
(Continued)

payload, and the authentication tag and forward the first frame to the data link layer. The data link layer generates a second frame on the data link layer and transmits the second frame to the in-vehicle network.

15 Claims, 11 Drawing Sheets

(52) U.S. Cl.
CPC .............. *H04L 2012/40215* (2013.01); *H04L 2012/40273* (2013.01)

(58) Field of Classification Search
CPC ..... H04L 63/166; H04L 69/22; H04L 69/325; H04L 67/12; H04L 2209/805; H04L 2209/84; H04L 9/0643; H04L 63/126; H04L 63/164; H04L 69/326; H04L 9/3242
USPC ........................................................ 713/171
See application file for complete search history.

(56) References Cited

U.S. PATENT DOCUMENTS

| | | |
|---|---|---|
| 10,095,634 B2 | 10/2018 | Sharma |
| 10,171,463 B1 | 1/2019 | Wiger |
| 11,321,442 B2 | 5/2022 | Zeh et al. |
| 2004/0081193 A1 | 4/2004 | Forest et al. |
| 2004/0174874 A1 | 9/2004 | Saito et al. |
| 2005/0157715 A1 | 7/2005 | Hiddink et al. |
| 2007/0133791 A1 | 6/2007 | Han et al. |
| 2008/0075073 A1 | 3/2008 | Swartz |
| 2010/0179696 A1* | 7/2010 | Grohman .................. F24F 11/52 715/764 |
| 2013/0195272 A1 | 8/2013 | Nagai et al. |
| 2013/0283044 A1 | 10/2013 | Tie et al. |
| 2015/0089236 A1 | 3/2015 | Han et al. |
| 2016/0316045 A1* | 10/2016 | Treves .................... H04L 41/00 |
| 2016/0323312 A1 | 11/2016 | Voelker et al. |
| 2019/0116045 A1* | 4/2019 | Markham ........... H04L 63/0876 |
| 2019/0166134 A1 | 5/2019 | Tzeng et al. |
| 2022/0255963 A1 | 8/2022 | Zeh et al. |

FOREIGN PATENT DOCUMENTS

| | | | |
|---|---|---|---|
| EP | 3297247 A1 | 3/2018 | |
| JP | 2004015582 A | 1/2004 | |
| JP | 2004328706 A | 11/2004 | |
| JP | 2012113723 A | 6/2012 | |
| JP | 2018057044 A | 4/2018 | |
| JP | 2018182767 A | 11/2018 | |
| KR | 20060071836 A | 6/2006 | |
| KR | 20180029846 A | 3/2018 | |
| WO | WO-2019143405 A1 * | 7/2019 | ......... G06F 13/4282 |

OTHER PUBLICATIONS

Kent, S. "IP Authentication Header." Network Working Group. Request for Comments: 4302. Dec. 2005. pp. 1-5, 9, 11, 13, and 20-21.

Kent, S. and Seo, K. "Security Architecture for the Internet Protocol." Network Working Group. Request for Comments: 4301. Dec. 2005. p. 1-5, 9-10, and 98.

Madson, C., et al. "The Use of HMAC-MD5-96 within ESP and AH." Network Working Group. Request for Comments: 2403. Nov. 1998. p. 1-7.

Strang, Dr. Thomas and Röckl, Matthias. "Vehicle Networks CAN-based Higher Layer Protocols." 2008/2009. pp. 1-46. STI—Innsbruck. URL: https://www.sti-innsbruck.at/sites/default/files/courses/fileadmin/documents/vn-ws0809/03-vn-CAN-HLP.pdf.

"OSI-Model." Wikipedia. Jan. 29, 2022. URL: https://en.wikipedia.org/wiki/OSI_model.

Suzuki, T., et al., "Required Courses in a Security Society," Textbook issued by Uchida Human Development Co., Ltd., pp. 4, 2015.

IEEE Standard for Local and Metropolitan Area Networks, Media Access Control (MAC) Security, IEEE Sdt 802.1AE-2018,Dec. 26, 2018, S. 19-22, 48-72, 141-143, 183-187.

Kurachi, R., et al., "Centralized Monitoring System in CAN using Message Authentication," 2016, vol. 199, pp. 118-130.

Takemori, K., et al., "Protection for Automotive Control System Using Secure Boot and Authentication," 2014, pp. 47-54.

* cited by examiner

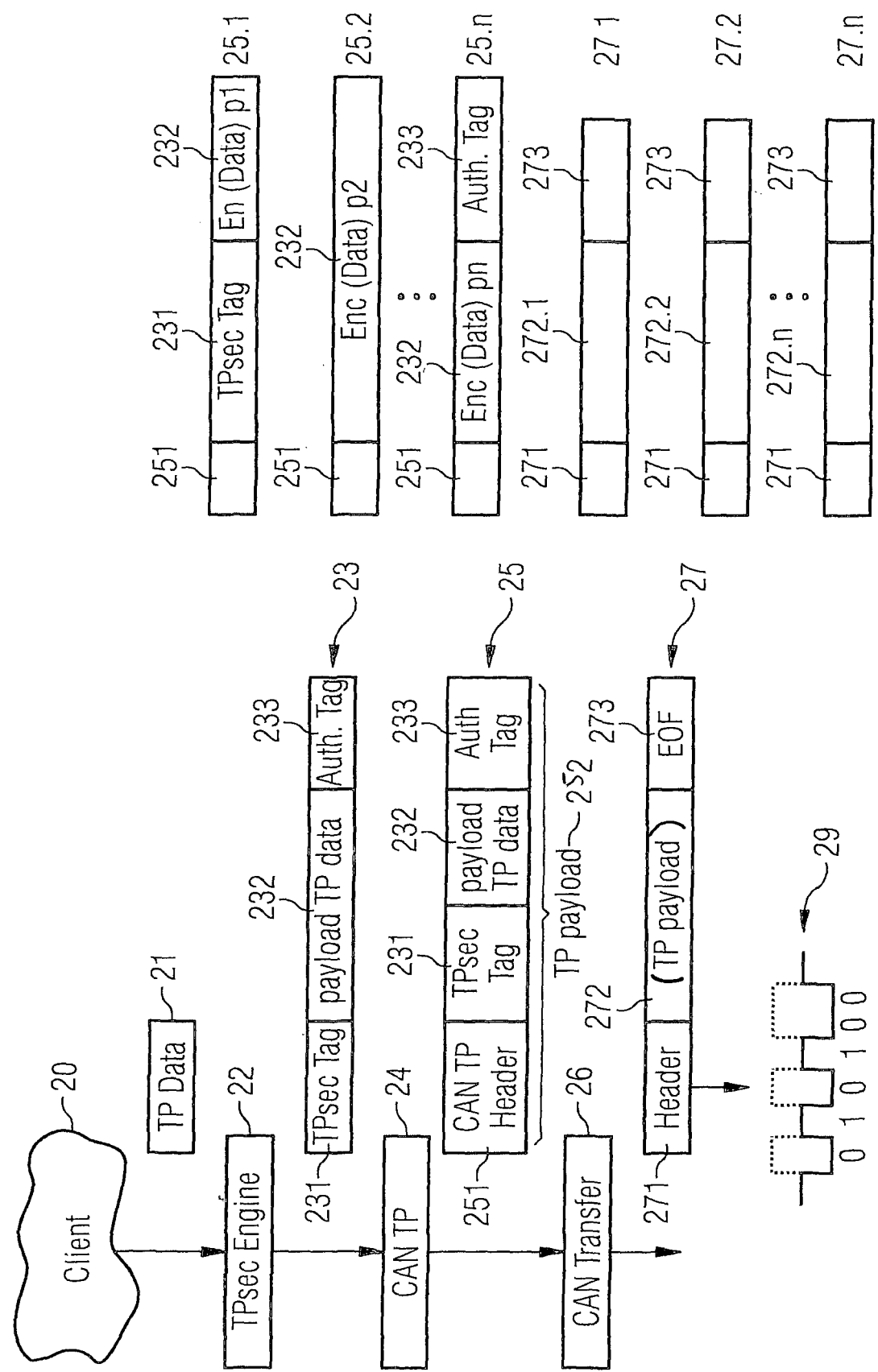

FIG 4
Scenario 1: TP Payload Data length > Max. bytes of CAN layer
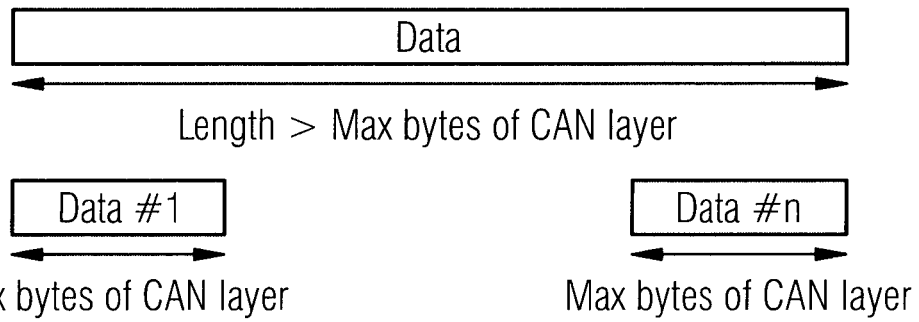
Scenario 2: TP Payload Data length < Max. bytes of CAN layer
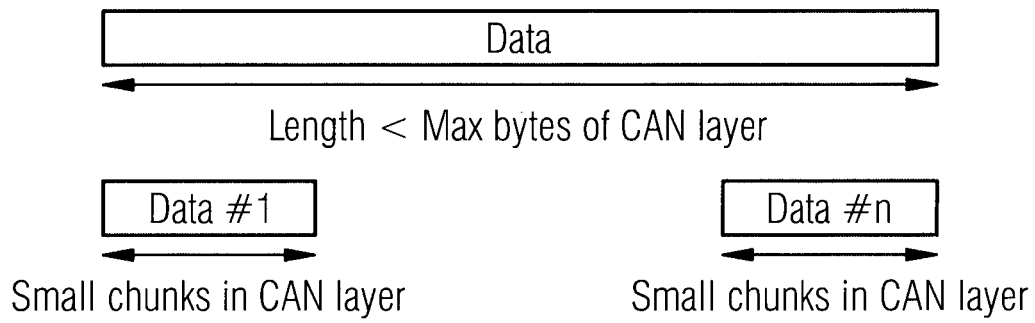

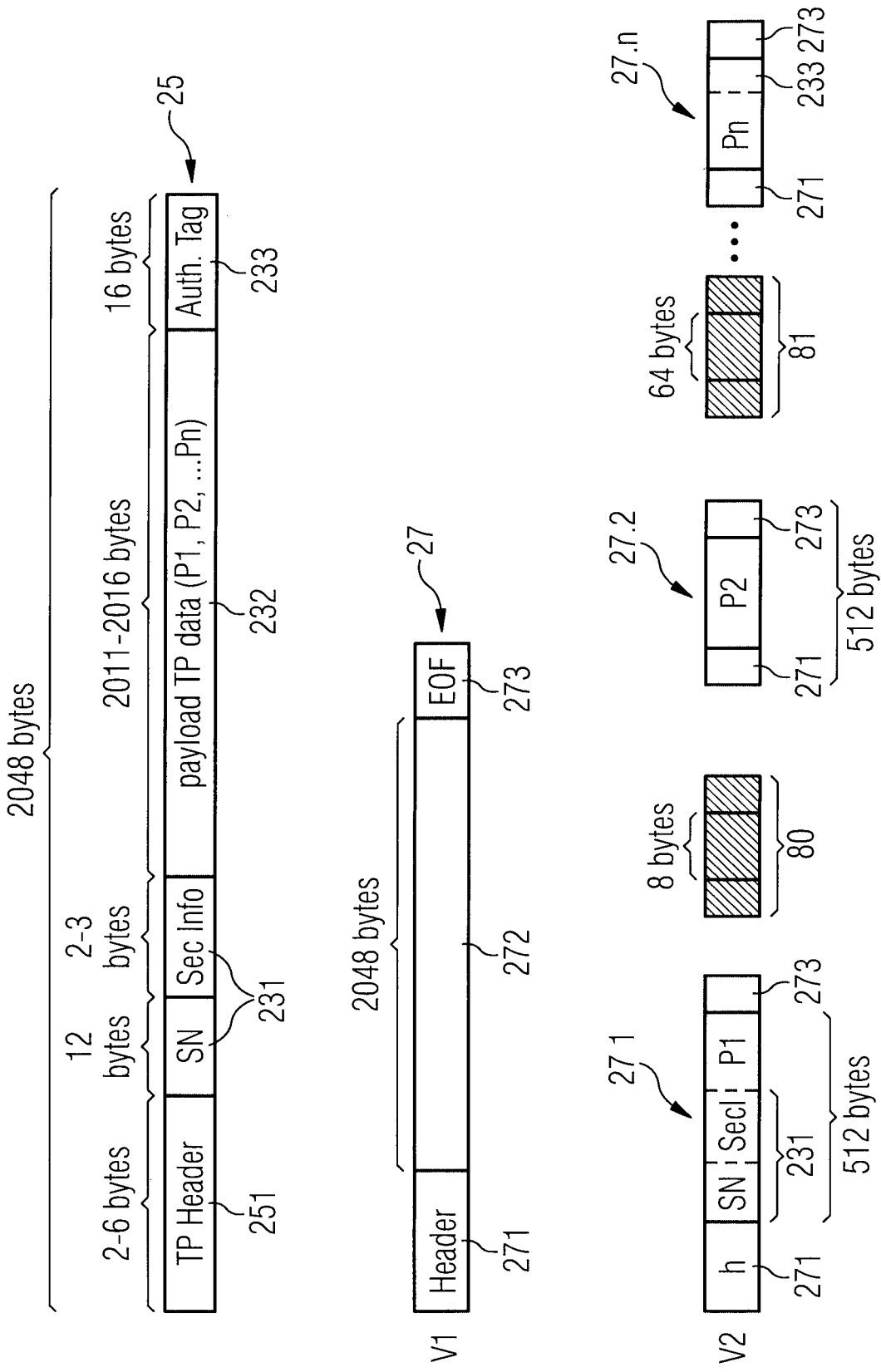

TRANSPORT LAYER AUTHENTICITY AND SECURITY FOR AUTOMOTIVE COMMUNICATION

FIELD

The present disclosure relates to authentication and security on the transport layer or network layer in vehicular networks.

BACKGROUND

In today's vehicles, data integrity and security became a necessity. In the past, the function of steering was provided by a physical connection from the steering wheel to the wheels of a vehicle. The same holds for braking and gear shifting functions. In today's vehicles, there is no longer such physical connection but an electrical wire or bus communicating the steering command to the electric steering. In response to the steering command over the bus, the electric steering will actuate a turn of the wheels corresponding to the turn of the steering wheel.

Having access to the bus may allow for insertion of malicious bus communication or commands in attempt to take over functions of a vehicle. The risk of inserted malicious bus commands is further increased with the growing entertainment functionality and connectivity in today's vehicles.

For autonomous driving vehicles and cars, the risk is even higher, because sensor data analyzing a surrounding of the car, as well as commands to actuators controlling the vehicle may be transmitted via bus communication.

SUMMARY

According to an embodiment, a sender configured to participate in an in-vehicle network. The sender is configured to receive a request for transmitting a payload and to generate, in response, a first header in the transport and/or network layer. It is further configured to access a key K of k bytes length and to generate an authentication tag using the key K and at least the first header as additional authentication data. The authentication tag serves to indicate an authenticity of a first frame on the transport and/or network layer as original frame sent from the sender to a receiver. The sender is further configured to generate the first frame comprising the first header, a transport layer payload and the authentication tag and to forward the first frame to the data link layer, the data link layer to generate a second frame on the data link layer and to emit the second frame to the in-vehicle network. It should be understood that also a plurality of second frames that correspond to the first frame can be emitted.

BRIEF DESCRIPTION OF THE DRAWINGS

Embodiments are described herein with reference to the appended drawings.

FIG. 2 demonstrates the generation of a CAN frame;

FIG. 4 demonstrates two scenarios, which motivate the distribution of the TP sec message into several TP sec frames;

FIG. 8 shows an embodiment how data can distributed on frames.

DETAILED DESCRIPTION

Figure 1A:
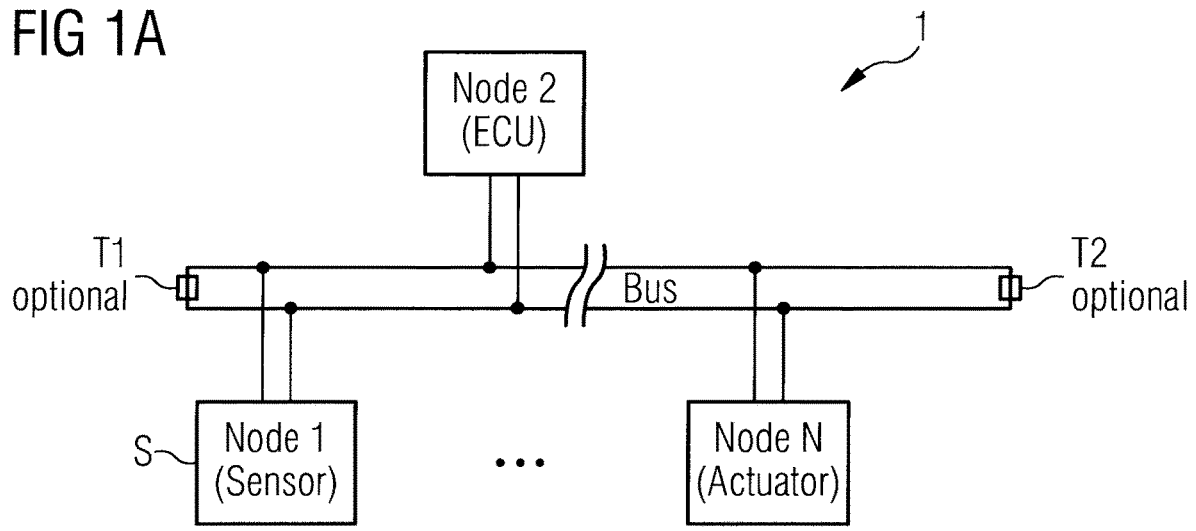
FIG. 1a illustrated an exemplary bus connecting several nodes.

FIG. 1a illustrated an exemplary bus connecting several nodes Node1, Node2, . . . , Node n. In the example of FIG. 1a, the bus is depicted as a two line bus system, which may conveniently be implemented as differential lines. Obviously, other setups are conceivable, too. The bus system may be terminated with optional termination resistors T1, T2 which help to reduce reflections on the bus typically affecting signal quality along the bus. Prominent examples of bus systems in a vehicle are CAN (Controller Area Network), CAN-FD (CAN-Flexible Data Rate), CANXL (CAN X Large) and LIN (Local Interconnect Network) networks.

It will be appreciated that the bus depicted in FIG. 1a may also be arranged in a ring-type topology where both ends of the bus are fed into a master unit (not shown) thereby forming a bus loop. In this case, the individual nodes Node 1,2, . . . , n are coupled to the bus in a similar way.

Vehicle networks or bus-based communication systems (as depicted in FIG. 1a) have specific attributes reflecting requirements for in-vehicle networks. The in-vehicle network supports communication of sensor data to a control unit by data frames being transmitted from the sensor or a controller of the sensor to a control unit on a higher level. A useful protocol may be used for the data frames or protocol frames communicated between individual nodes or participants of the bus-based communication network.

In return or in response to receipt of sensor data, the controller of the sensor or the control unit on the higher level may send a certain command to an actuator coupled to the bus, say a braking command to a brake actuator. In the example of FIG. 1a, Node 1 could represent an angle sensor (not shown) measuring an angle of how far a brake paddle is depressed. This angle information may be transmitted in (a) protocol frame(s) to the ECU (electronic control unit) of a higher level, say Node 2. In response to receiving the angle value, the ECU may send one or more frames over the bus to Node n, the brake actuator. These frames sent from the ECU to the brake actuator shall cause a braking action.

It will be apparent that bus communication related to a braking action is time critical and needs to be transmitted quickly. Such real-time requirements are not common in standard communication networks.

In-vehicle communication networks typically have a well-defined number of bus participants that, by default, stays constant over the lifetime of a vehicle, ignoring some upgrades of the vehicle for a moment. Likewise, existing links between individual nodes, hence a topology of the bus based communication system will not be altered over the lifetime of the vehicle. For a standard computer network, such a situation is very unlikely. In fact, it is for standard computer networks required to allow addition or removal of nodes during operation of the computer network. Further, new links may be added or links may be removed during operation in standard computer networks.

In in-vehicle networks (IVN), it is of interest to assure authenticity of a protocol frame transmitted over the bus.

It will be appreciated that indicating authenticity of a protocol frame on a transport or network layer is of interest in order to reduce involvement of higher protocol layers in authentication of time-critical commands communicated between participants of the bus based communication system.

With increasing entertainment systems as well as increasing vehicle-to-vehicle communication becoming available today, there is an increasing susceptibility to injected malicious commands or protocol frames.

It is therefore of interest to provide data security for protocol frames in order to prevent injection of the malicious protocol frames. As for authenticity indication of protocol frames, it is attractive to provide the data confidentiality at the transport or network layer level. This way, involvement of higher protocol layers or software stacks on higher protocol layers providing security and/or authenticity information becomes unnecessary. It will be apparent to a person skilled in the art, that data security and authenticity functions can be supported by hardware elements such as a sender or a receiver. In other words, data security and authenticity functions may be off-loaded to dedicated hardware on the transport or network layer level. Of course, the data security may not only provided in protocol frames on the transport and/or network layer. Additional security measures on upper layer or lower layer may be additionally provided without leaving the scope of the invention.

Figure 1B:
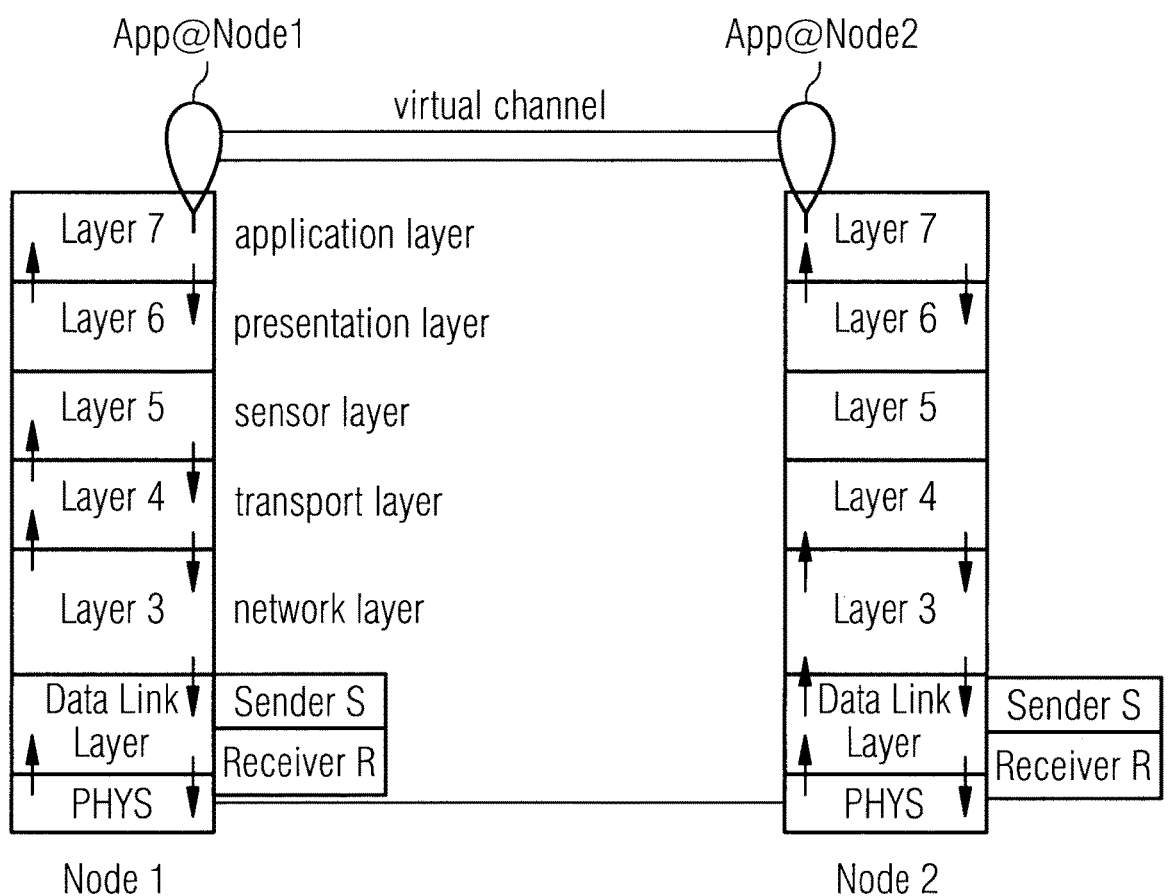
FIG. 1b illustrates nodes as participants of a bus on different ISO-OSI layers.

FIG. 1b illustrates Node 1 and Node 2 as participants of a bus based communication system as illustrated in FIG. 1a. Communication between Node 1 and Node 2 flows in different layers that can be categorized according to the well-established OSI-ISO layer model. The lowest level layer is the so-called physical layer, indicated as PHYS for Node 1 and Node 2. Each layer in the OSI model accepts an order from a higher level, performs some action at its level, and may trigger tasks in a lower lying level by forwarding a request to the lower lying level.

The uppermost layer in the OSI-ISO model is the application layer 7, which describes a function of the nodes being abstracted from the details of the communication. An application may be the determination that a braking command shall be initiated and be sent to another node. The details how this communication is performed are not part of the application layer. Instead, the command is forwarded to the presentation layer 6.

There are known concepts for authenticity of data communication in vehicles in the application layer on layer 7 of the OSI-ISO layer model using a software stack, indicated as App 1, App2 for Node 1 and Node 2, respectively in FIG. 1b. It may be convenient to introduce a concept of virtual channels between Node 1 and Node 2 in order to indicate an authenticated and/or protected communication between two or more participants using the software stacks App@Node1 and App@Node2.

An example to provide security for onboard networks in a vehicle using software stacks is SEC OC (SECure OnBoard Communication) according to the AUTOSAR (AUTomotive Open System Architecture) standard. It may be convenient for car manufactures to specify the software stacks App for Node 1 and Node 2, giving freedom in hardware implementation of Node 1 and Node 2. As a trade-off, authenticity and/or data security using a software stack may no longer meet real-time requirements for the time from a command from the electronic control unit (ECU) to a response of an actuator as depicted as Node n in FIG. 1a participating in the bus based communication system. Consider for example a braking command sent in a frame from the control unit ECU—depicted as Node 2 in FIG. 1a—to the braking actuator Node n in FIG. 1a. If such communication needs to be authenticated and secured by using the software stack, all layers for an individual Node will be involved, which may take too long for a time-critical braking operation.

A further disadvantage of a software stack authenticity and/or data security solution may derive from not-properly designed software stacks, such that the authenticity and/or confidentiality functionality get degraded or even compromised.

A command to the physical layer may be received from the data link layer, as indicated by the downward arrow between the PHYS layer and the data link layer. As layer function, the physical layer of Node 1 may use a connection or link to Node 2 in order to communicate data on the physical layer to the Node 2. Under the same token Node 1 may receive data from Node 2 over the physical link between Node 1 and Node 2, and further forward the received data to the data link layer on top of the physical layer. The upward arrow between the physical layer and the data link layer of Node 1 in FIG. 1b indicates this forwarding. The protocol flow in Node 2 is analog to the one explained for Node 1.

Some of existing bus based communication networks in vehicles do not follow the separation of physical layer and data link layer as suggested in the OSI-ISO model. To reflect this specialty sender S and receiver R are depicted in FIG. 1b as extending over the physical layer PHYS and the Data Link Layer.

If authentication and/or encryption function are integrated on lower levels of the OSI-ISO stack, the speed of the authentication may increase and/or the communication may become more secure because it is less vulnerable to attacks on the software on the nodes.

Therefore it is, depending on circumstances, attractive to integrate the functionality pertaining to authenticity and/or data security to a transportation and/or network layer of an individual participant to the communication system, such as in Node 1 or Node 2 in FIG. 1b. It is possible to integrate these functions even on a lower layer, the data link layer 2. However, integration the authenticity and/or data security functionality to the data link layer 2 may be limited by the length of the frames of the protocol layer. The frames provided on the data link layer may be too short to efficiently and securely integrate security and/or authentication information. If each frame on the data link layer carries just a payload of 8 bits, it would be not efficient to use a large part of this payload for authentication. In one example, the payload to the classical CAN frame is up to 8 bytes long. Using less than 4 bytes of this payload for authenticity would increase the vulnerability at brute force attacks.

In modern CAN bus architectures, frames of different length may be transmitted over the bus. Especially the modern CAN FD and CANXL protocols support longer CAN frames. It would be possible to integrate security and/or authentication data on the data link layer without losing too much efficiency. However, there will be shorter CAN frames on the bus. First, older devices that only support classical CAN will be still present. Further, it is not desired to let long frames occupy the bus for longer time period. Urgent messages cannot be transmitted quickly if few long messages hinder the bus communication of other participants. Accordingly, the average length of frames will probably be limited.

Thus, we propose to integrate the security and/or authenticity functions on the transport layer and/or the network layer.

Frames, for which no authenticity is established, may be already dropped on the transport or network layer of the receiver. If an authenticity test shows that a protocol frame did not come from the specific sender and/or did not arrive at the receiver in its original form, the frame can be dropped without further processing. Flooding one participant of the bus based communication system with invalid or non-authenticated frames shall only affect this one node on the transport or network layer, while the higher protocol layers may remain unaffected. For a software stack based approach to authenticity and/or data security, such confinement of authenticity and/or data security could not be done.

Further, it is convenient to use dedicated hardware elements. Namely a sender on the transport and/or network layer and/or a receiver on the transport and/or network layer may implement the authenticity and/or data security as a piece of dedicated hardware. This would have a further advantage that such a building block can be used as a standard circuit without further adaptation needed if bus participants or software applications App at the participant change over time.

Turning now to FIG. 2, the generation of a CAN frame is demonstrated. The client 20, which is an application on ISO-OSI layer seven, hands TP data 21 over to the TPsec engine 22. TP data 21 may comprise a sequence of bits, which may be coded specific command. The TPsec engine 22 generates a TPsec message 23 that comprises a TPsec tag 231, the payload TP data 232 and an authentication tag 233.

The TPsec tag 231 may comprise a sequence number, a secure channel ID and crypto information. The crypto information defines e.g. which of the cipher suites are used or which mode is used.

The payload TP data 232 is generated by encoding the TP data 21 using e.g. AES (Advanced Encryption Standard).

The authentication tag 233 may represent an authentication indication that the CAN TP frame 25 was intended to be transmitted from a sender S to a receiver R. The authentication tag 233, in some embodiments, further allows to check whether or not the transmitted frame was altered on its way to the receiver. CAN TP frame 25 will also be called first frame.

While the security tag authentication tag 233 is depicted downstream the payload TP data 232, it may as well be arranged upstream of the payload TP data 232 or even integrated into the standard header H.

It will be appreciated that a secret key K is required for authentication, encryption and decryption. Key deployment is not at the heart of the present disclosure for several reasons:

Firstly, in an automotive environment the number of participants in a bus based communication system is limited and does not change much over lifetime of the vehicle. It may be convenient to use one key K of length k for all participants on the bus communication system.

If individual nodes communicatively coupled via the bus communication system should use an individual key K, this individual key could be stored in respective nodes of the bus based communication system during production of the vehicle. There could be a first key K1 for communication between Node 1 and Node 2, stored at Node 1 and Node 2, and a second key K2 for communication between Node 1 and Node 3, stored at Node 1 and Node 3, respectively, and so forth. It is assumed that sender S and receiver R use the same key K, hence decryption, encryption, authentication, and verification to be symmetric.

If more than one key K is used within the system, it may be of interest to store information regarding the key(s) K involved in authentication and/or data security may be stored or indicated in an optional security info field SecInf (not shown here). It is a further option to indicate using the security info field whether or not the present protocol frame 100 is an authenticated only protocol frame or an authenticated and encrypted protocol frame 100.

The field TP sec tag 231 is a further optional element. It may comprise the sequence number 72 is a once-used integer number, also referred to as nonce. If the sequence number 72 changes in a way that is unknown to a listening party, it helps prevent replay attacks to be successful.

As simplest implementation of authentication and/or data security on the data link layer, one may implement a scheme with authentication only, with a frame including the sequence number in the TP sec tag 231, if a replay protection is required. If such protection is not required the TP sec tag 231 may be omitted allowing larger payload TP data 232.

The TP sec message 23 is given over to the CAN TP unit 24 and generates a CAN TP frame 25 or a plurality of CAN TP frames 25.1, . . . , 25.n, n being an integer greater than one. The generation of the CAN TP frame may done according to the standard ISO 15765-2, also called ISO-TP. The protocol allows for the transport of messages that exceed the eight byte maximum payload of classical CAN frames. ISO-TP may prepend one or more metadata bytes to the payload data in a 8 byte classical CAN frame, reducing the payload to seven or fewer bytes per frame. ISO-TP segments longer messages into multiple frames, adding metadata that allows the interpretation of individual frames and reassembly into a complete message packet by the recipient. It can carry up to $2^{32}$ bytes of payload per message packet. The metadata is called the Protocol Control Information, or PCI. The PCI is one, two or three bytes. The initial field is four bits long indicating the frame type, and implicitly describing the PCI length.

The CAN TP frame 25 includes the TP payload 252, which comprises the CAN TP Header 251, the TP sec tag 231, the payload TP data 232 and the authentication tag 233. The CAN TP Header 251 comprises the Protocol Control Information PCI.

If the TP sec message 23 became too long to be transferred to over the CAN bus in one CAN frame, multiple CAN TP frames 25.1 to 25.n are producted, whereby n is an integer greater one. Each of the multiple CAN TP frames has a CAN TP header 251. Each of the frames carries a part of entirety of the TP sec tag 231, the payload TP data 232 and the authentication tag 233. In the example of FIG. 2, the first CAN TP frame 25.1 carries the TP sec tag 231 and a first part of the payload TP data 232. The second CAN TP frame 25.2 carries a second part of the payload TP data 233. The last CAN TP frame 25.n carries the last part of the payload TP data 232 and the authentication tag 233.

Figure 3:
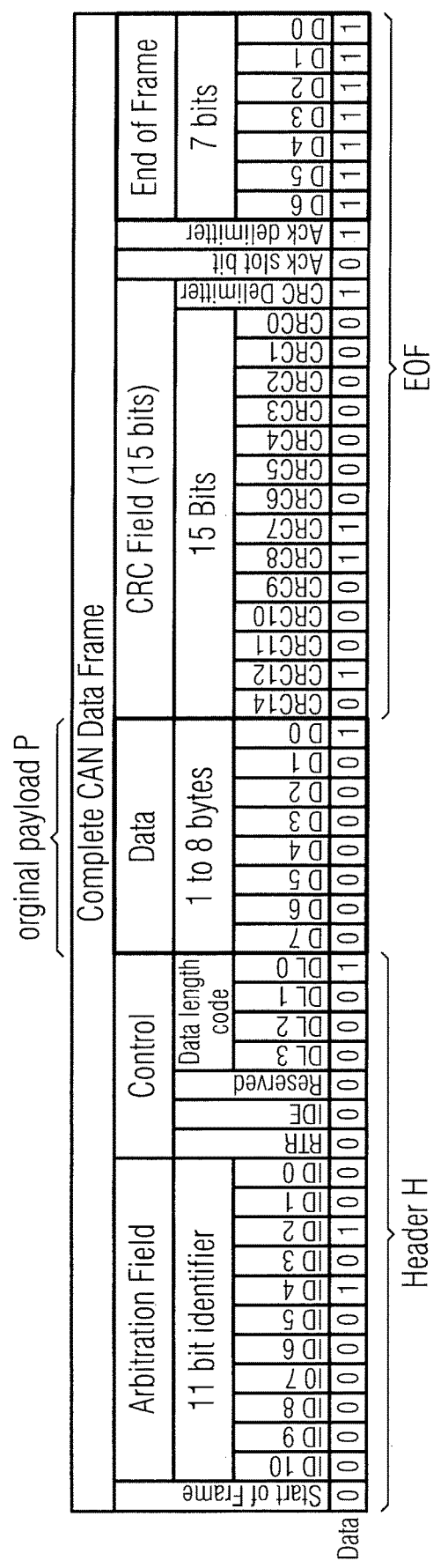
FIG. 3 illustrates a protocol frame according to the CAN standard.

The CAN Transfer block 26 generates a CAN frame 27, which may be also called second frame. The CAN frame 27 comprises a Header 272, a payload 272 carrying the TP payload 252 and an end of frame portion EOF. FIG. 3 illustrates a protocol frame according to the CAN standard. The CAN frame starts with a header H having an arbitration field of 11 bit, followed by a control field of 7 bit. Both arbitration field and control field are portions of the CAN frame of a bit length not commensurable to a full byte length. Note, that the arbitration field may comprise of 29 bits according to CAN and CAN-FD standard, which are variants of the CAN standard as mentioned before.

The data field of 8 bytes corresponds to a payload P of an original protocol frame. A CRC field of 15 bits, together with an acknowledge slot bit, and an Acknowledge delimiter bit, as well as 7 bit of End of Frame correspond to the end of Frame portion EOF of the protocol frame.

In a vehicular environment, a concurrent operation of older and recent devices according to different protocol variants is likely. As an example, rather old devices, say ABS sensors, may communicate according to an early variant of the protocol, for example the classical CAN protocol, while more recent devices, such as a LIDAR system may communicate with an electronic control unit using the CAN-FD standard or even using to the CANXL standard. It may therefore be useful to indicate the different protocol types in the header H, as this would also effect the level of authenticity and/or data protection that applied to an individual protocol frame 100. Under such circumstances it may be of interest to have the total frame length of N bytes or bits stored or coded somewhere in the protocol frame. Setting a frame length flag would be one option how the frame length could be coded. How such information could be stored in the protocol frame may be taken from the protocol specification.

The end of frame indication eof may further comprise error check information, as known in the art and is therefore not explained any further at this point.

Returning now back to FIG. 2, the payload 272 of the CAN frame is taken from the CAN TP frame 25 or from one of the CAN TP frames 25.1 to 25.n. The payload 272 will be called TP payload. In case of several CAN TP frames, each of the CAN TP frames 27.1 to 27.n carries as payload 272.1, 272.2 or 272.n one of the CAN TP frames 25.1, 25.2, . . . , 25.n.

The bits of the CAN frame are output on a CAN bus as a voltage level signal 29 to the wires. The CAN bus may e.g. comprise two copper wires named CAN_HIGH and CAN_LOW. ISO 11898-2, also called high speed CAN (bit speeds up to 1 Mb/s on CAN, 5 Mb/s on CAN-FD), uses a linear bus terminated at each end with 120Ω resistors.

High speed CAN signaling drives the CAN high wire towards 5 V and the CAN low wire towards 0 V when transmitting a dominant (0), and does not drive either wire when transmitting a recessive (1). Designating "0" as dominant gives the nodes with the lower ID numbers priority on the bus. The dominant differential voltage is a nominal 2 V. The termination resistor passively returns the two wires to a nominal differential voltage of 0 V. The dominant common mode voltage must be within 1.5 to 3.5 V of common and the recessive common mode voltage must be within +/−12 of common. The dash line indicates the voltage at the CAN high wire, whereby the complete line indicates the voltage at the CAN low wire.

If the participant is a receiver, the information flow goes into the opposite direction, from the bottom of FIG. 2 to its top. The receiver receives a signal 29, converts the signal 29 into digital values and extracts the CAN frame 27 respectively the CAN frames 27.1, . . . , 27.n from the digital values on the data link layer. The CAN frames 27, 27.1, . . . ,27.n are forwarded to the upper layers, the network and the transport layer, thereby transforming the CAN frames 27 to TP frames 27. From the TP frames 27, the CAN TP header 251, the TPsec tag 231, the payload TP data and the authentication tag 233 are extracted. The extracted data are fed into an authentication unit, which checks the authentication. If the payload TP data are encrypted data, they will be decrypted.

FIG. 4 demonstrates two scenarios, which motivate the distribution of the TP sec message into several TP sec frames. It should be understood that there may be more scenarios, in which the split of the TP sec message is helpful. In the first scenario, the data length of the TP sec message 23 is larger than the maximum length of a respective payload of a CAN frame of the specific CAN protocol, which may be e.g. classical CAN, CAN FD or CANXL. In this case, the data of the TPsec message is split into several CAN TP frames 25.x, such that each underlying CAN frame can be filled up to its maximum length.

In the second scenario, the data length of the TP sec message 23 is smaller than the maximum length of a respective payload of a CAN frame of the specific CAN protocol. However, in the car, it is desired to send only small chunks of data on the CAN bus to allow other participant to send their messages between the smaller CAN frames. In this case, the CAN TP message is also split such that each of the CAN frames carries a part of the data of the CAN TP message. Each CAN frame is smaller than the maximal frame length allowed by the specific CAN protocol.

Figure 5:
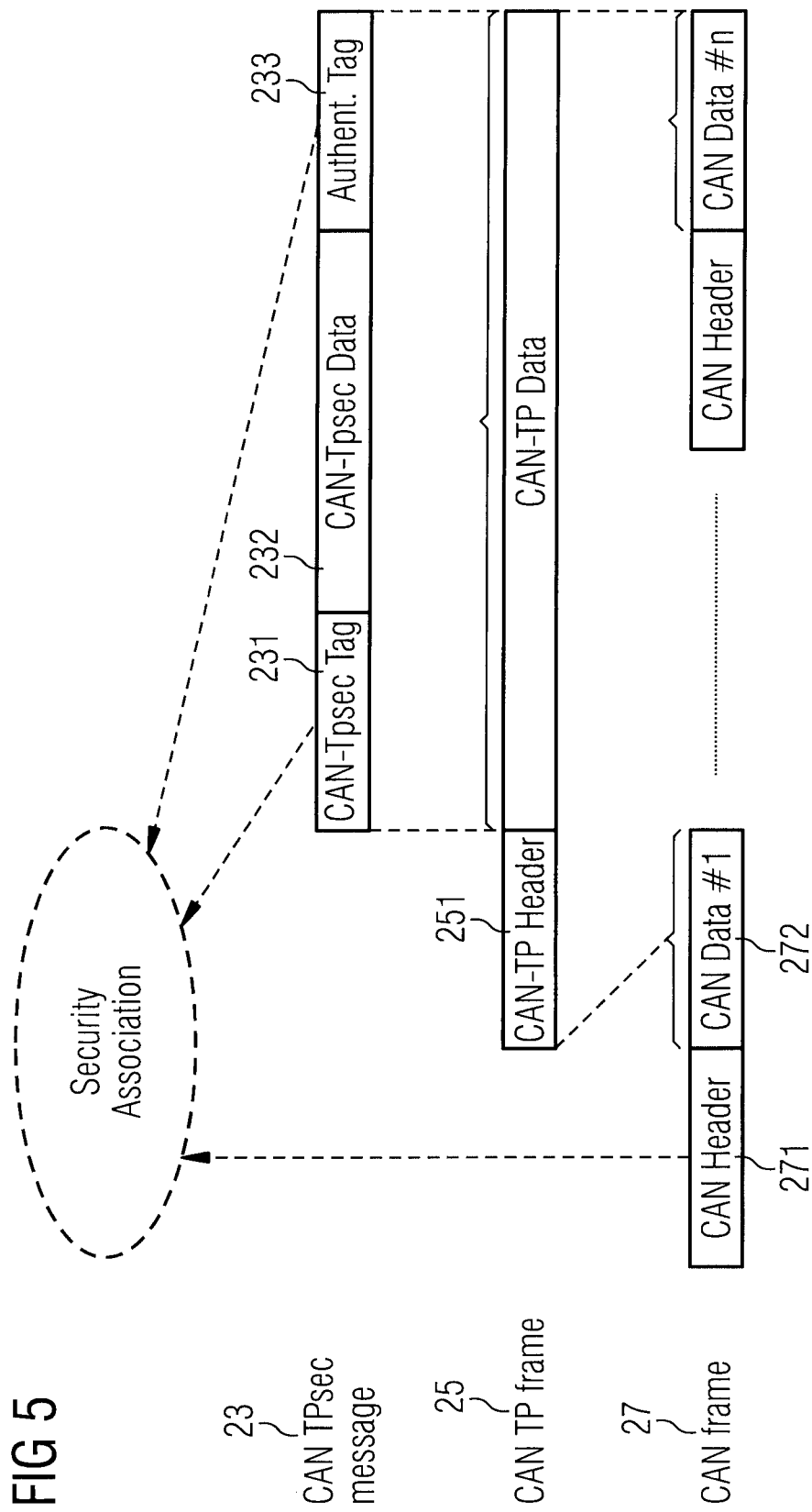
FIG. 5 shows how the security association is derived.

FIG. 5 illustrates how the security association is derived. FIG. 5 shows the CAN TP sec message 23, the CAN TP frame 25 and the CAN frame 27. As before, the CAN TP sec message comprises a TP sec tag 231, the payload TP data 232 and the authentication tag 233. The CAN TP frame 25 comprises the CAN TP header 251 and the CAN TP data that comprises the CAN TP sec message. The security association is established between at least two TP clients and is generated by a concatenation of the CAN ID as part of the CAN header and the TP sec tag 231.

Figure 6:
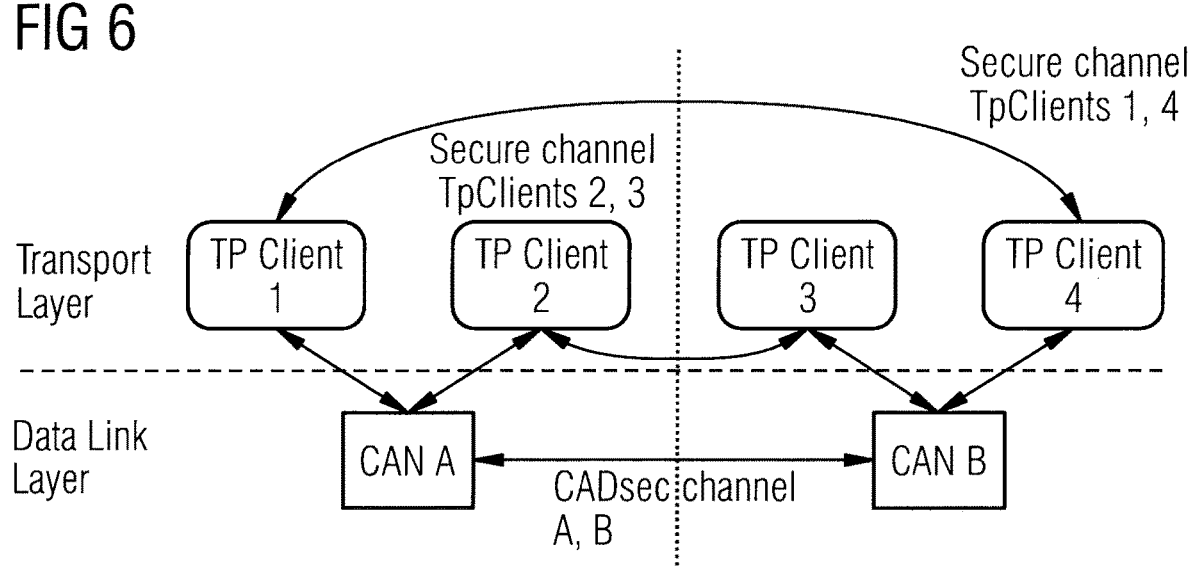
FIG. 6 illustrates how security and/or authentication can be established on different layers.

FIG. 6 illustrates how security and/or authentication can be established on different layers. Four TP clients in the transport layer and two CAN participants in the data link layer are shown in FIG. 6. The two CAN participants are connected through a secure CAN channel. An example for such a secure CAN channel is disclosed in the co-pending German patent application DE 10 2019 004 790.7 filed on Jul. 11, 2019.

TP client 1 and TP client 2 are connected to the CAN participant A as being in the same node such that they can forward and receive messages and frames between the units on transport layer and data link layer. Accordingly, TP client 3 and 4 belong to another node together with the CAN participant B. TP client 3 and TP client 4 can each forward and receive frame and messages to and from the CAN participant B.

As a first option, the security association can be established between two TP clients. In this example, security association is present between TP clients 2 and 3 and another security association is between TP clients 1 and 4. The maximum length of bytes is $2^{32}$ and the overhead is produced per TP frame.

As a second option, the security association can be established on the data link layer between CAN nodes. Here, the maximal length is 6, 64 and 2048 bytes, depending on the CAN standard. The overhead has to be spent for each CAN frame. Further, it is possible to combine both security association by establishing in no both, the transport layer and the data link layer.

In the following, examples of protocol frames 100 implementing different levels of authentication and/or data security on data link layer shall be discussed with regards to FIGS. 7a-7e.

One convenient way of implementing authenticity and/or data security protection for protocol frames is to use what we may call Symmetric Authentication and/or Data Security Engines implemented as hardware blocks, also referred to as SADSE, as will be explained in more detail now turning to FIGS. 7a-7d.

Figure 7A:
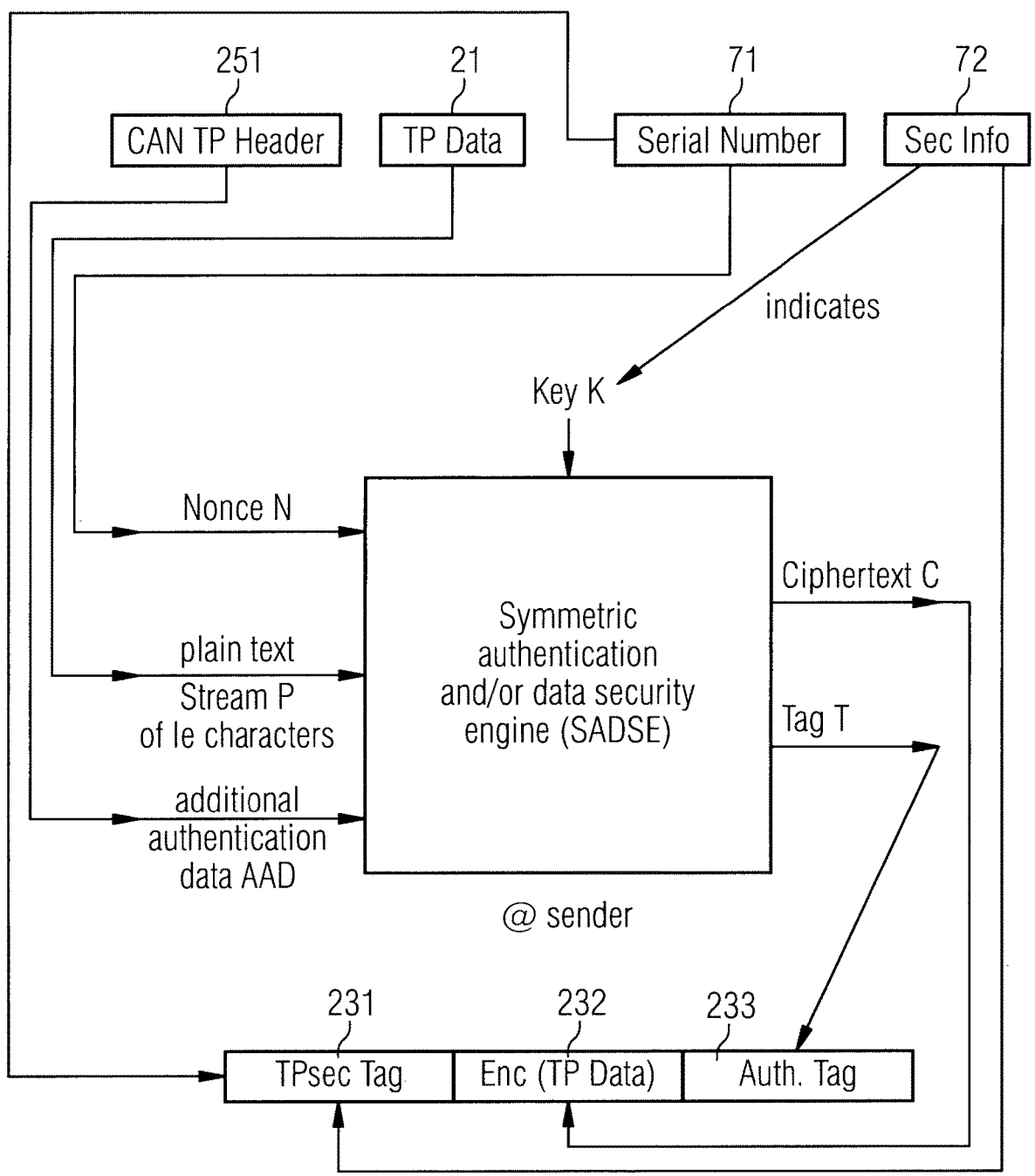
FIG. 7a shows input and output variables of a SADSE for authentication only at a sender.

FIG. 7a shows input and output values for an SADSE. Naming of the input and output variables of the SADSE follows a naming convention established for block cipher modes in cryptography literature. One will appreciate that a SADSE may operate in an Authenticity Only AO mode or in an Authenticated Encryption mode AE. FIG. 7a will shows the AE mode. The SADSE accepts a secret key K, a nonce N, an input stream P of le characters length, and an additional authentication data AAD as input. The outputs are an output stream cipher text C of le characters length and a tag T.

The key K is conveniently a symmetric key of a certain length, say e.g. 128, 192 or 256 bits. As mentioned before, key distribution is not in the focus of this disclosure. In fact, corresponding schemes are known, such as the MACsec Key Agreement defined in IEEE 802.1X-2010. In some embodiments, a plurality of keys can be used and a SecInfo data field 72 selects which of the plurality of keys is used.

The nonce N is typically an integer value that is used only once. One may, depending on circumstances, decide to have an identical value for N for more than one generation of the outputs of the SADSE. In circumstances, in which no replay protection is needed and the generic key K is used in the bus based communication system, the sequence number 72 and the security info SecInf fields may be omitted.

The additional authentication data includes the CAN TP header and may further including parts of the TP Data 21 or the complete TP Data 21.

The input stream P is fed by the TP data 21. The plain test steam P is encrypted using the key. The result of the encryption is output as cipher C.

The tag T is calculated based on the used inputs of the SADSE. The tag T will indicate whether the protocol frame 100 was intended to be sent from the named sender S to the given receiver R (both typically mentioned in the header H).

A serial number 71 that indicates a unique number for the to-be-transported TP data 21. The TP data 21 itself will be input as plain text to the SADSE. The CAN TP header 251 feeds the SADSE's input additional authentication data AAD. The cipher output C is used as payload TP data 232 and the tag T as authentication tag 233. Accordingly, the TP data 21 will be transmitted in encrypted form over the bus. The serial number 71 and the sec Info 72 will be written into the TPsec tag 231.

Figure 7B:
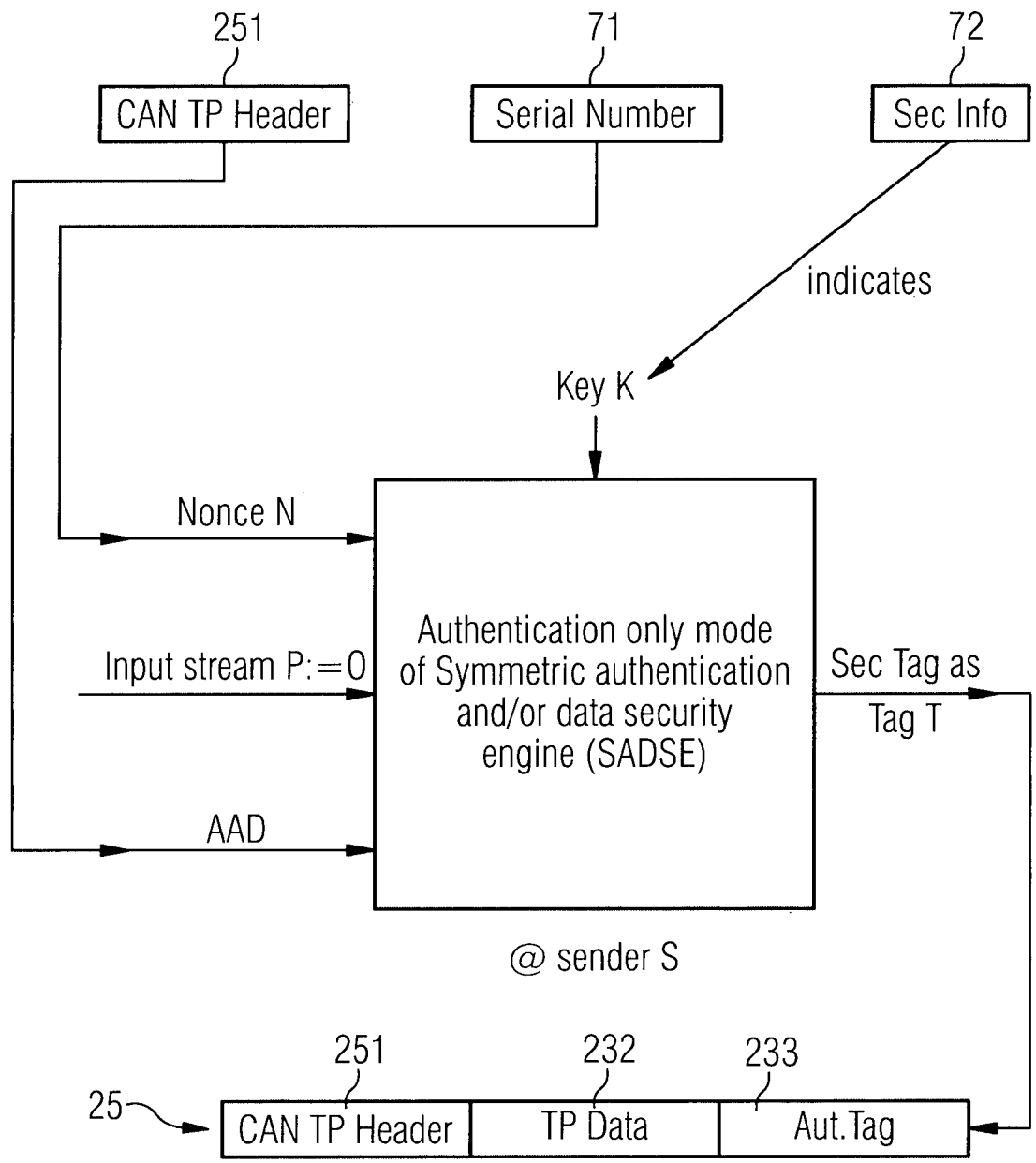
FIG. 7b shows input and output variables of a SADSE for authentication only at a receiver.

Turning now to FIG. 7b, let us consider that the SADSE is in the authentication only mode AO at the sender S to authenticate a CAN TP frame. In this mode, the input stream P is not used. The use of the key K is the same as before. SADSE further receives the sequence number 72 and the additional authentication data AAD as input.

The additional authentication data includes the CAN TP header 251 and may further (not shown in FIG. 7) including parts of the TP Data 21 or the complete TP Data 21. If replay protection is not required, the protocol frame 100 may not comprise a sequence number 72, as discussed above in combination with FIG. 2b. As a consequence of the serial number 72 not being set, the nonce N may be left at the previously used value or set to zero or any other convenient value. The nonce N, if used, has to be identical at the sender and the receiver.

If only one generic key K is used as secret key within the bus based communication system, the CAN TP frame 25 may not comprise the security info SecInf field.

In circumstances, in which no replay protection is needed and the generic key K is used in the bus based communication system, the sequence number 72 and the security info SecInf 72 fields may be omitted. As explained above, the nonce N may be left at the previously used value, set to zero, or any other convenient value. In FIG. 7b, the option is shown, in which no serial number 71 and no Sec Inf 72 are used. The TPsecTag 231 are not used or filled, e.g., with zeros.

The SADSE outputs a tag T calculated using the key K, the nonce N, and the additional authentication data AAD as calculation basis. The tag T will be used in the authentication tag 233 of the CAN TP frame.

Figure 7C:
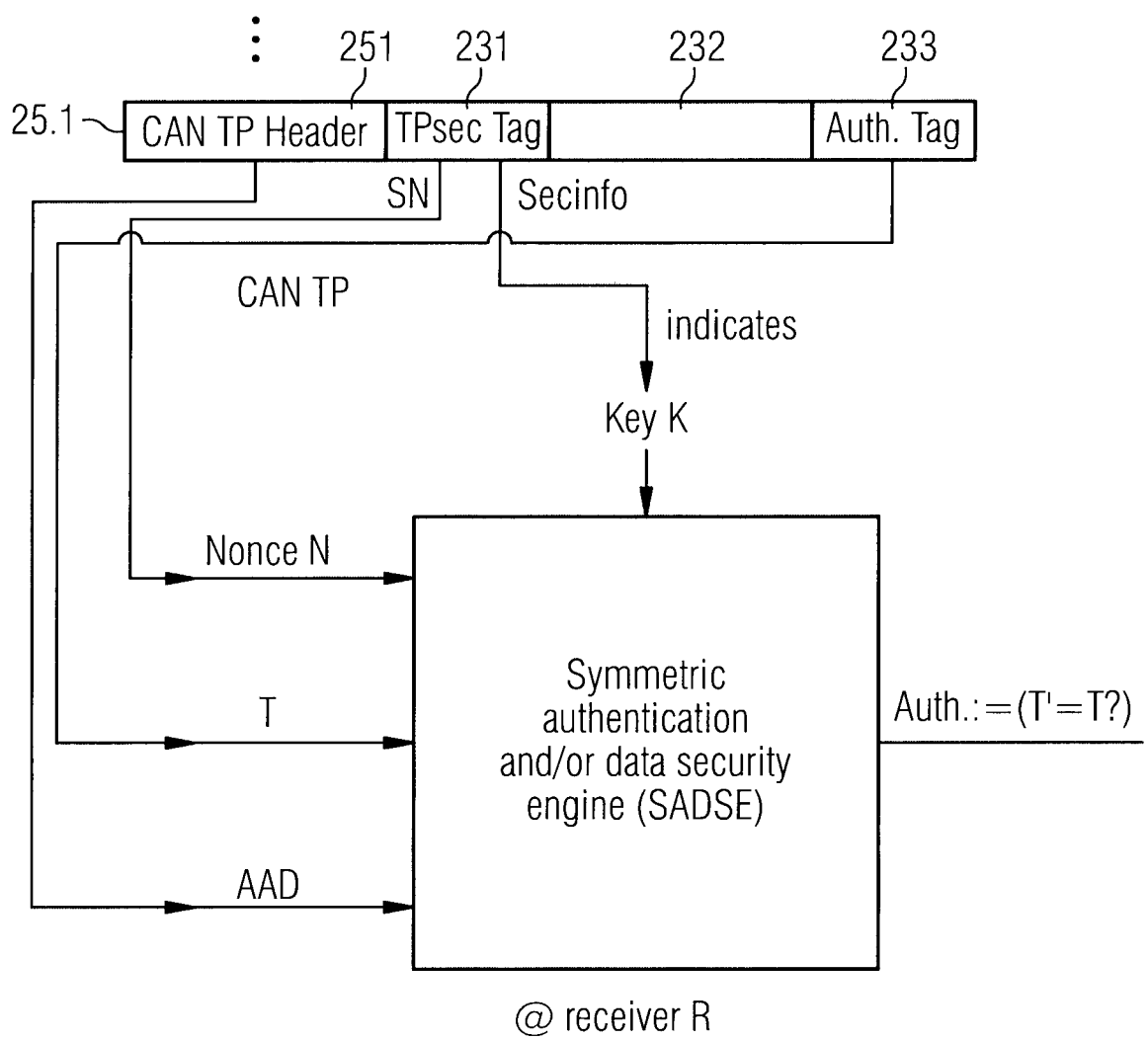
FIG. 7c shows input and output variables of a SADSE for authenticated encryption at a sender.

Turning now to FIG. 7c, let us consider the SADSE to be in the authentication only mode at the receiver. The receiver receives CAN frames 27.1, 27.2, 27.3 and generates CAN TP frames out of them. FIG. 7c shows how the content of an CAN TP frame 25.1 is used to generate an authentication. The SADSE receive a nonce from the TPsec Tag 231, which was a serial number. If the TP sec tag 231 contains SecInfo data, these data will be used to select a key K of a plurality of keys. If only one key is used, no Sec info data will be used at the receiver. The transmitted authentication tag 233 will be fed to the tag input T of the SADSE, whereas the CAN TP header is input to the additional authentication data input. The SADSE calculates a tag T' based on the key K and the nonce N. The output authentication identification AI of SADSE indicates if the calculated T' equals the input tag T. If this is the case, the CAN TP frame 27.1 is considered as being authentic. In an, not shown in FIG. 7c, alternative, the calculated tag T' is put out.

The authentication only mode at the receiver authenticates a CAN TP frame received at the receiver R as being an original protocol frame intended to be sent from the sender S to the receiver. In other words, the receiver authenticates a CAN TP frame according to FIG. 2.

In the authentication only mode AO at the receiver, the additional authentication data AAD comprises all information of the CAN TP frame 25 starting with the CAN TP header 251 and optionally part of the payload TP data 232 or the complete payload TP data 232. If replay protection is not required, the protocol frame 100 may not comprise a sequence number 71, as discussed above in combination with FIG. 7b. As a consequence of 71 not being set, the nonce N may be left at the previously used value or set to zero or any other convenient value.

A comparison of the received security tag T within CAN TP frame 27.1 with the newly calculated tag T' at the receiver allows to authenticate whether received CAN TP frame 27.1 was intended for transmission from the sender to the receiver. If the payload TP data 232 were also used to calculated the tag T at the sender and the tag T' at the receiver, the authentication identification AI indicates whether or not the protocol frame 100 is in its original form.

It may be convenient for SADSE to directly output an authenticity indication AI, corresponding to the result of comparing the newly calculated tag T' to the security tag SecTag within the protocol frame 100. Given the security tag SecTag is input to the SADSE, all information for this comparison is available to the SADSE.

Now, let us consider an authenticated encryption mode of the SADSE, also referred to as AE mode.

Figure 7D:
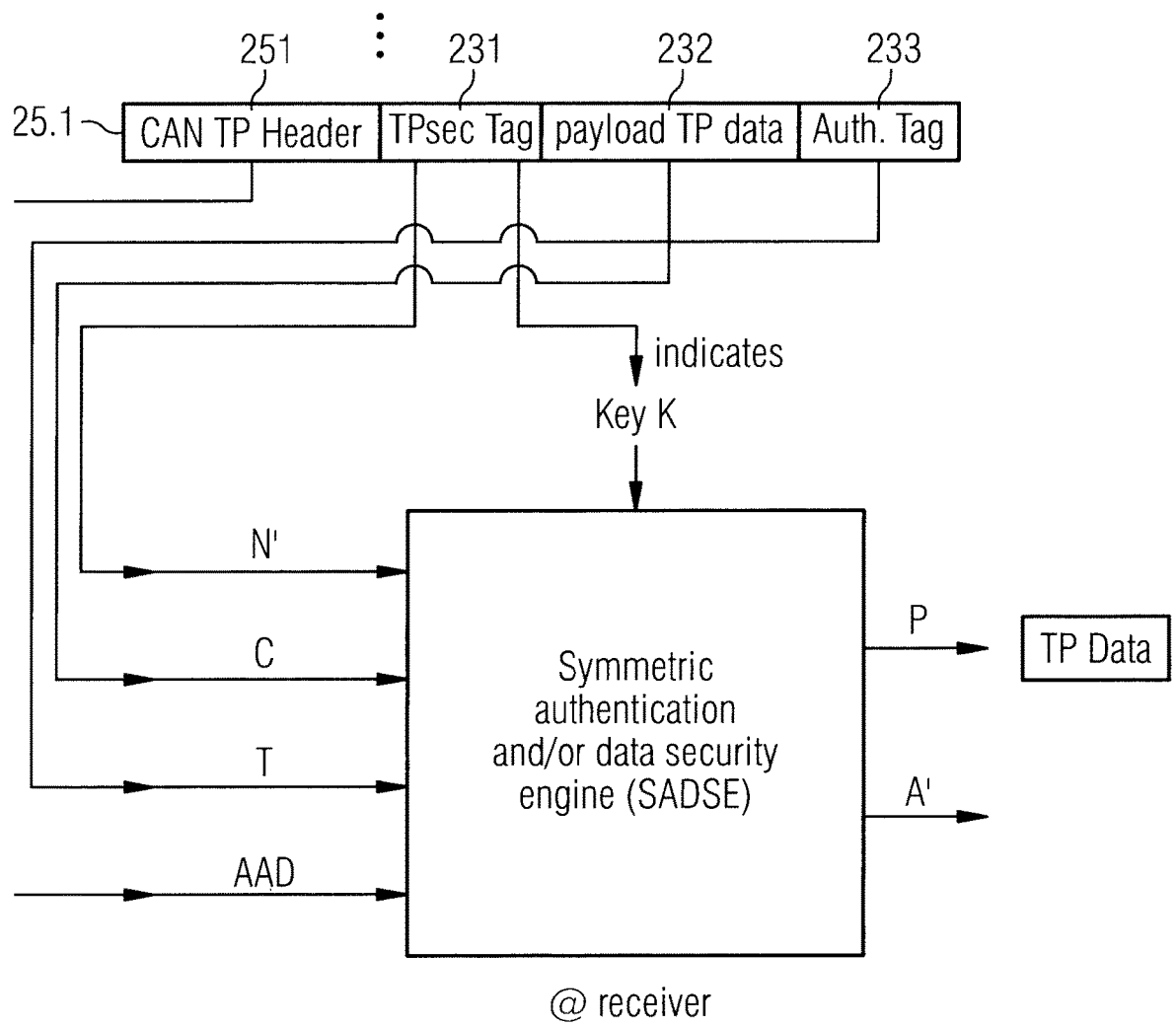
FIG. 7d shows input and output variables of a SADSE for decryption and authentication at a receiver.

Turning now to FIG. 7d, an AE mode for the SADSE at the receiver is described. The SADSE receives a key K, a nonce N, a cipher text C, a tag T and additional authentication data AAD. The inputs for the key K, the nonce N, the tag T and the additional authentication data AAD are fed to the SADSE according to the embodiments of FIG. 7c. Additionally, the input for the cipher C derives from the received payload TP data 231 that derives from the encryption of the TP data 21 in the SADSE at the sender.

In the AE mode at the receiver R, the SADSE outputs, as output the plain text P. The SADSE generates the decrypted version of the cipher C based on the the cipher CC and the key K.

In the AE mode at the receiver R, the SADSE may outputs a tag T' calculated using the key K, the optional sequence number as nonce N, and the additional authentication data AAD. The tag T' is a recalculation of the security tag SecTag generated at the sender S. In the embodiment, the SADSE outputs a comparison value as AI indicting the result of the comparison between the received tag T and the tag T' calculated at the receiver. It may be convenient for SADSE to directly output an authenticity indication AI, indicating the result of comparing the newly calculated tag T' to the security tag SecTag within CAN TP frame 27. The authentication indication may be, e.g., "verified" or "not verified".

One possible way to implement the SADSE according to the present disclosure would be a block cipher mode. A prominent example of such a block cipher mode is the AES-GCM (Galois-Counter Mode).

For AES-GCM, there exists a recommendation by NIST, the National institute for standards in the US, regarding respective bit lengths for input and output values of the AES-GCM. These parameters are summarized for authentication only mode AO in Table 1.

TABLE 1

| Variables for SADSE implemented using AES-GCM with symmetric cipher E using key K | |
|---|---|
| authentication only mode AO | Size in Bits |
| Key K | 128, 192, or 256 |
| Sequence number 72 | 96 |
| Counter | — |
| Additional authentication Data AAD | 128*a |
| Plain text P | — |
| Authentication Tag | 128 |
| Cipher C | — |

For the authentication only mode AO, the plain text stream of le characters is not used, as well as the corresponding cipher text over the protected payload PP as plain text stream, which corresponds to the discussion of the AO mode of SADSE with regards to FIGS. 7b and 7c.

With regards to the additional authentication data AAD the length of 128*a bits is to indicate that an integer multiple a of 128 bits should be chosen to optimize performance of the AES-GCM mode implementing the SADSE of the present disclosure. Reaching a multiple of 128 bits may conveniently be achieved with zero padding. The counter CTR is an internal variable of the AES-GCM and reproduced for the sake of completeness, as not used in the AO mode.

Table 2 summarizes the respective bit length for input and output parameters of the AES-GCM implementing the SADSE.

TABLE 2

| Variables for SADSE implemented using AES-GCM with symmetric cipher E using key K | |
|---|---|
| authenticated encryption mode AE | Size in Bits |
| Key K | 128, 192, or 256 |
| Sequence number 72 | 96 |
| Counter | 32 |
| Additional authentication Data AAD | 128*a |
| Plain text P | 128*p |
| Authentication Tag | 128 |
| Cipher C | 128*p |

Different to the authentication only AO mode parameters in Table 1, the authenticated encryption mode AE makes use of the counter, which is implemented as a 32 bit value.

Cipher Text C and the Additional authentication Data AAD should for optimal performance of the AES-GCM implementing the SADSE be a multiple of 128 bit long. To achieve such bit length zero padding is a convenient option.

FIG. 8 shows an example how a CAN TP frame 25 can be forwarded to the data link layer to form CAN frames 27. The CAN TP frame 25 comprises a CAN TP header 251 of 2 to 6 bytes and a payload, that comprises a TPsec tag 231, payload TP data 232 of 2011 to 2016 bytes and an authentication tag 233 of 16 bytes. The TPsec tag 231 consists of the serial number of 12 bytes and the SecInfo of 2 to 3 bytes. The payload TP data consists of a plurality of payload parts P1, P2, . . . , Pn.

In the version 1, v1, a CANXL frame 27 is generated on the data link layer comprising a CAN header 271, the payload 272 which is a copy of the frame 25 above and an end-of-file part 273. Here, the content of the TP frame 25 is transmitted in one frame. In the version 2, v2, the content of TP frame 25 is distributed on a plurality of CANXL frames 27.1, 27.2, . . . , 27.n. Each of these frames 27.1, 27.2, . . . , 27.n comprises a header 271, a payload of 512 bytes and an end-of-file 273. The frame 27.1 comprises as payload the SecTag 231 and the payload portion P1, the frame 27.2 comprises as payload P2 and the frame 27.n the payload portion Pn and the authentication tag 233.

First, the frame 27.1 is sent, then a frame 80 from a different sender, then frame 27.2 followed by a frame 81 from a different sender. At the end, frame 27.n is sent over the network. The smaller frames 27.1 to 27.n allow that smaller frames 80 and 81 from other senders can be timely transmitted. Frame 80 carries a payload of 8 bytes, while frame 81 carries a payload of 64 bytes.

The above-described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein. The embodiments are described with the help of CAN standards, other protocols may be used as well.

REFERENCE SIGN LIST

1 in-vehicle network
20 Client
21 TP data message
22 TPsec engine
23 TP sec message
24 CAN TP unit
25, 25.1 . . . 25.n CAN TP frame (first frame)

26 CAN transfer block
27 CAN frame (second frame)
29 voltage level signal
231 TP sec tag
232 payload TP data
233 authentication tag
251 CAN TP header (first header)
271 Header (second header)
272 TP payload
273 end of file

The invention claimed is:

1. A transmitting device configured to participate in in-vehicle network communications, the transmitting device comprising:
 a communication system comprising at least one processor and a memory that stores a key of k bytes length, the communication system comprising an Open Systems Interconnection model (OSI model) comprising a plurality of hierarchical layers through which communication flows, the plurality of hierarchical layers including a transport layer, a network layer, a data link layer, and a physical layer coupled to a communication bus, wherein the communication system is configured to:
  receive a payload request for transmitting a payload,
  generate, in response to the payload request, a first header in at least one of the transport or the network layer,
  access the key from the memory,
   wherein the key is selected from a plurality of keys based on SecInfo data from a TPsec Tag that comprises a sequence number, secure channel information, and crypto information,
  generate an authentication tag using the key and at least the first header as additional authentication data, wherein the authentication tag comprises digital data that indicates an authenticity of a first frame on at least one of the transport layer or the network layer as an original frame sent from the transmitting device to a receiver,
  generate the first frame comprising the first header, a transport layer payload, and the authentication tag, and
  forward the first frame to the data link layer,
   wherein the data link layer is configured to use the first frame to generate a second frame on the data link layer and transmit the second frame to the in-vehicle network via the communication bus, and
   wherein an authenticity of the second frame as an original frame sent from the transmitting device is indicated based on an authentication check using at least data associated with the authentication tag and a second header extracted from the second frame as additional authentication data.

2. The transmitting device according to claim 1, wherein the communication system is configured to use at least part of the payload as additional authentication data for generating the authentication tag.

3. The transmitting device according to claim 1, wherein the communication system is further configured to generate a cipher text for the transport layer payload using:
 the key, and
 the payload.

4. The transmitting device according to claim 1, wherein the communication system is further configured to:
 generate a sequence number of a plurality of bytes; and
 integrate the sequence number into the first frame.

5. The transmitting device according to claim 1, wherein the communication system is configured to:
 receive security information, and
 select, during access of the key, the key from a plurality of keys based on the security information.

6. The transmitting device according to claim 5, wherein the communication system is further configured to:
 include the security information into the first frame.

7. The transmitting device according to claim 1, wherein the communication system is configured to generate the first frame according to ISO-15765-2.

8. A receiver device configured to participate in in-vehicle network communications, the receiver device comprising:
 a communication system comprising at least one processor and a memory that stores a key of k bytes length, the communication system comprising an Open Systems Interconnection model (OSI model) comprising a plurality of hierarchical layers through which communication flows, the plurality of hierarchical layers including a transport layer, a network layer, a data link layer, and a physical layer coupled to a communication bus, wherein the communication system is configured to:
  receive a first frame on the data link layer, wherein the first frame includes an authentication tag comprising digital data that indicates an authenticity of the first frame as an original frame transmitted by a transmitting device to the receiver device,
  extract a received payload from the first frame,
   forward the received payload to at least one of the network layer or the transport layer as a second frame,
  extract from the second frame, on at least one of the network layer or the transport layer, a first header,
  access the key from the memory,
   wherein the key is selected from a plurality of keys based on SecInfo data from a TPsec Tag that comprises a sequence number, secure channel information, and crypto information, and
  perform an authentication check by using the key, data associated with the authentication tag, and at least the first header as additional authentication data to indicate an authenticity of the second frame as an original frame sent from a transmitting device to the receiver device.

9. The receiver device according to claim 8, wherein the communication system is further configured to:
 extract a transport layer payload from the second frame.

10. The receiver device according to claim 9, wherein the communication system is further configured to perform the authentication check by using at least part of the transport layer payload.

11. The receiver device according to claim 9, wherein the communication system is further configured to generate a plain text using:
 the key;
 the transport layer payload as cipher text; and
 the first header as additional authentication data.

12. The receiver device according to claim 8, wherein the communication system is further configured to:
 extract a sequence number of a plurality of bytes from the second frame.

13. A method implemented by a transmitting device to participate in in-vehicle network communications, the method comprising:
- receiving a payload request for transmitting a payload;
- generating, in response to the payload request, a first header in at least one of a transport layer or a network layer;
- accessing a key of k bytes length from memory,
  - wherein the key is selected from a plurality of keys based on SecInfo data from a TPsec Tag that comprises a sequence number, secure channel information, and crypto information;
- generating an authentication tag using the key and at least the first header as additional authentication data, wherein the authentication tag comprises digital data that indicates an authenticity of a first frame on at least one of the transport layer or the network layer as an original frame sent from the transmitting device to a receiver;
- generating the first frame comprising the first header, a transport layer payload, and the authentication tag; and
- forwarding the first frame to a data link layer,
  - wherein the data link layer is configured to use the first frame to generate a second frame on the data link layer and to transmit the second frame to the in-vehicle network, and
  - wherein an authenticity of the second frame as an original frame sent from the transmitting device is indicated based on an authentication check using at least data associated with the authentication tag and a second header extracted from the second frame as additional authentication data.

14. A method implemented by a receiver to participate in in-vehicle network communications, the method comprising:
- receiving a first frame on a data link layer of the receiver, wherein the first frame includes an authentication tag comprising digital data that indicates an authenticity of the first frame as an original frame sent by a transmitter to the receiver;
- extracting a received payload from the first frame;
- forwarding the received payload to at least one of a network layer or a transport layer of the receiver as second frame;
- extracting from the second frame, on at least one of the network layer or the transport layer, a first header;
- accessing a key of k bytes length from memory,
  - wherein the key is selected from a plurality of keys based on SecInfo data from a TPsec_Tag that comprises a sequence number, secure channel information, and crypto information; and
- performing an authentication check by using the key, data associated with the authentication tag, and at least the first header as additional authentication data to indicate an authenticity of the second frame as an original frame sent from a transmitting device to the receiver.

15. The transmitting device of claim 1, wherein the authentication tag indicates that the first frame was intended to be transmitted from a sender of the first frame to a receiver of the first frame.

\* \* \* \* \*